Figure 1:
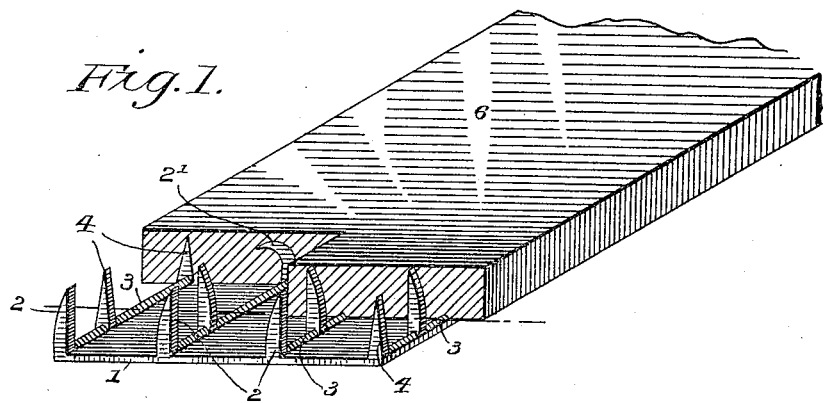

(No Model.)

L. T. POTTER.
BELT FASTENER.

No. 461,531.                    Patented Oct. 20, 1891.

WITNESSES
Wm Musser.
Jno. H. White.

INVENTOR
Lizzie T Potter.
by Willard Eddy, Attorney.

THE NORRIS PETERS CO., PHOTO-LITHO., WASHINGTON, D. C.

UNITED STATES PATENT OFFICE.

LIZZIE T. POTTER, OF HARTFORD, CONNECTICUT.

BELT-FASTENER.

SPECIFICATION forming part of Letters Patent No. 461,531, dated October 20, 1891.

Application filed October 27, 1890. Serial No. 369,431. (No model.)

*To all whom it may concern:*

Be it known that I, LIZZIE T. POTTER, of the city and county of Hartford, in the State of Connecticut, have invented certain new and useful Improvements in Belt-Fasteners, which improvements are described in the following specification and are illustrated by the accompanying drawings.

My invention belongs to that class of belt-fasteners in which the body of the belt-fastener consists of a metallic plate provided with teeth, which project from one side of the plate and are adapted to pierce and clinch the belt. The object of my invention is, first, to prevent the injurious cutting of the belt by the teeth; second, to secure the lightness of the fastener by using a thin plate with necessary re-enforcement, and, third, by means of the same re-enforcement to prevent the teeth from being stripped or broken from the plate. To accomplish these objects I dispose the teeth in a special manner in conjunction with a number of knife-edged ribs, which traverse the toothed side of the plate.

The best manner in which I have contemplated applying the principles of my invention is shown in the drawings, in which—

Figure 2:
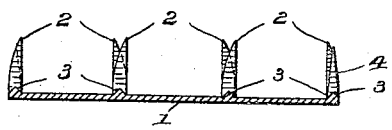

Figure 1 is a perspective view of a piece of belting provided with a belt-fastener, which is constructed in accordance with my invention. Fig. 2 is a cross-sectional view on the central broken line in Fig. 1.

In the views the numeral 1 denotes a rectangular metallic plate constituting the body of a fastener, and varying in size according to the size and strength of the belt 6, to which the fastener is to be applied. Plate 1 is made plane and smooth on one side, as indicated in Fig. 2, for the purpose of avoiding friction with shifters and idle-pulleys. It is also plane upon the other side, except for the teeth and ribs, which are now to be described. The ribs 3, being equidistant and parallel, and having preferably an elevation of about three thirty-seconds of an inch, are knife-edges of uniform cross-section formed integrally with the plate, and running across the toothed side of the same from edge to edge in the direction of the length of the belt. The teeth, indicated by the numerals 2 and 4 and arranged in rows parallel to the edges of the plate, are formed integrally with said plate and ribs in such a manner that each tooth includes a portion of one rib in its own base of attachment to the plate. Each tooth, separately considered, is a plate whose width is in the direction of the length of the rib to which it belongs. The tooth is thickest at the base or junction with plate 1, and is sharpened to a cutting-edge at the tip, as seen in the drawings. Of the several teeth 2 2 2 and 4, which stand in a single line across the belt, that last mentioned is thus sharpened by being beveled equally on both sides, and does not exceed in length the thickness of belt 6, while the remaining teeth in the same row are beveled upon one and the same side only, and are a little longer than the thickness of the belt.

This belt-fastener is applied to the belt in the usual manner by hammering the teeth into the belt. As the teeth enter the belt the tips of all the teeth 2 of each single row across the belt are bent over in one and the same direction convenient for clinching, and are hammered down and clinched, as seen at 2', while the shorter teeth 4 enter the belt without bending and are not clinched. At the same time ribs 3 are buried in the under side of the belt without cutting the fiber in a direction to diminish its tensile strength.

The mode of operation of my invention is such that the teeth, by reason of their described construction, cut the belt less injuriously than the same is usually cut by teeth having a different direction of sharpening and clinching, and the ribs 3 not only re-enforce the plate in the middle where weakness is most observed, but also increase the width of base of each tooth in the direction of the length of the belt, and so brace and prevent the tooth from being stripped from the body of the fastener when subjected to the strains of use.

Such being the construction and operation of my invention, I claim—

1. A metallic belt-fastener consisting of a smooth plate having pairs of flat chisel-pointed teeth whose individual members are beveled upon opposite sides, respectively, and are braced in the direction of the width of the teeth and the length of the belt by ribs running across the toothed side of the plate, substantially as and for the purpose specified.

2. In a metallic belt-fastener, a plate smooth on one side and having upon its opposite side a number of knife-edged ribs running across the plate in the direction of the length of the belt, and respectively surmounted by rows of clinching-teeth and by rows of clinching and non-clinching teeth, substantially as and for the purpose specified.

In testimony whereof I have hereunto set my name in the presence of two witnesses.

LIZZIE T. POTTER.

Witnesses:
  WILLARD EDDY,
  RICHARD H. MATTUS.